March 9, 1926.
W. F. MOWRY
1,575,782
LIQUID MEASURING DEVICE
Filed July 5, 1924
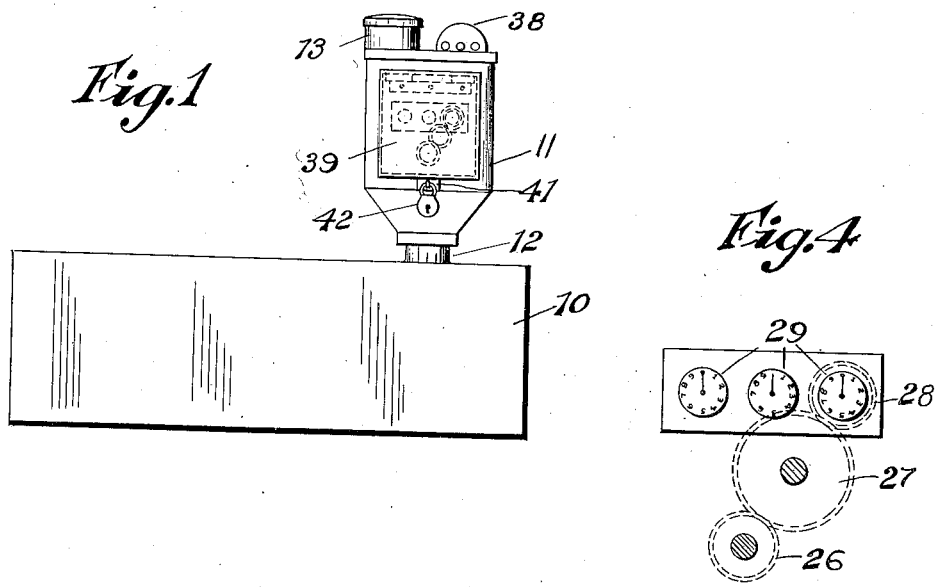
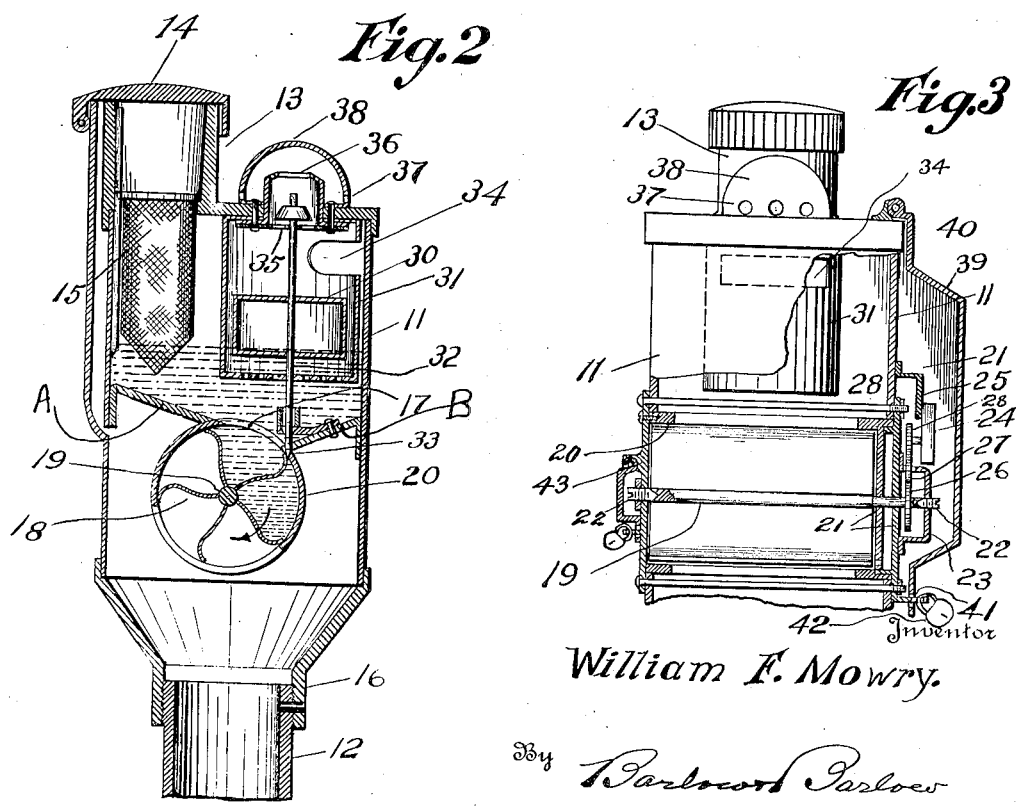
William F. Mowry.
Attorneys Patented Mar. 9, 1926.

1,575,782

UNITED STATES PATENT OFFICE.

WILLIAM F. MOWRY, OF ATTLEBORO, MASSACHUSETTS.

LIQUID-MEASURING DEVICE.

Application filed July 5, 1924. Serial No. 724,387.

*To all whom it may concern:*

Be it known that I, WILLIAM F. MOWRY, a citizen of the United States, residing at Attleboro, in the county of Bristol and State of Massachusetts, have invented certain new and useful Improvements in Liquid-Measuring Devices, of which the following is a specification.

This invention relates to an improved construction of liquid-measuring device for storage receptacles such as those used for motor vehicles; and has for its object to provide in such a device an auxiliary tank through which fluid is passed into the storage receptacle, and to mount a bladed wheel or other suitable, rotatable member in the outlet passageway of the tank to be rotated by fluid passing through it into the storage receptacle, also to provide a quantity indicator which is operated by the wheel for showing the amount of liquid which passes the wheel on its way into the receptacle.

A further object of this invention is to provide a cover or closure member for the quantity indicator and means for locking or sealing the closure member so as to prevent inspection by unauthorized persons.

The invention further consists in the provision of a float for moving a detent into and out of position to control the action of the measuring wheel and to mount this float in a casing or cylinder to prevent the same from being tampered with.

A still further object of the invention is the provision of an air vent to permit air pressure to escape freely from the auxiliary tank so as to prevent air pressure in the tank from operating the measuring wheel.

With these and other objects in view, the invention consists of certain novel features of construction, as will be more fully described, and particularly pointed out in the appended claims.

In the accompanying drawings:

Figure 1 is a side elevation showing a storage receptacle for gasoline and the like and a receiving tank or mechanism housing member through which the liquid is passed into the storage receptacle, the tank having means affixed thereto for indicating the amount of liquid passed through the tank.

Figure 2 is a sectional side elevation of my improved auxiliary tank.

Figure 3 is an end elevation showing the tank as partly broken away to illustrate the action of the mechanism mounted therein.

Figure 4 is a view showing the counting or indicating mechanism and the train of gears by which this indicating mechanism is actuated by rotation of the liquid operated wheel.

It is found in the operation of motor vehicles, particularly the truck type which consumes large quantities of gasoline, of advantage to be able to check up the driver's report as to the amount of gasoline paid for, and to provide a device through which the liquid is passed into the storage receptacle, so constructed that its measuring mechanism cannot be tampered with, and also to provide an indicator or counter which will accurately show the amount of liquid which has passed through it and also to provide means for concealing this counter so that a driver or unauthorized person cannot see what the counter is registering, and therefore, he has no means for checking up his report and only the owner or an authorized person can inspect the counter to determine whether or not the report turned in by the driver is correct; and the following is a detailed description of one construction of mechanism by which this result may be accomplished:—

With reference to the drawings, 10 designates the main or storage receptacle which is carried by the vehicle and 11 shows the receiving tank through which the gasoline must be passed in order to fill the main or storage receptacle. This receiving tank is soldered, locked or otherwise fixed onto the neck 12 of the main receptacle 10 and this auxiliary tank is provided with a filling neck 13 preferably set off to one side of the central axis through the tank and is provided with a closure cap 14.

In the neck of this opening is mounted a screen 15 which is also soldered or otherwise fixed in position.

Intermediate the inlet neck 13 and outlet neck 16, I have formed an outlet passageway 17 between the downwardly inclined plates A and B which passageway is positioned preferably on the opposite side of the vertical axis of the tank, to that of the inlet neck 13, or out of alignment with this neck, to prevent the insertion of any instrument through the neck to tamper with the measuring mechanism, the plate A forming a deflecting plate beneath the neck 13 and having its edge adjacent the passage 17. Below this passageway, I have mounted a bladed or bucketed wheel 18 on a shaft 19 to rotate in a portion of the cylinder 20, whereby the fluid flowing into the storage receptacle acts upon the blades of this wheel and rotates the same in the direction of the arrow, and on this shaft 19 which extends out through the walls 21 and which is recessed and supported on bearing screws 22, one of which is mounted in a bracket 23 and the other in the end wall 43 of the cylinder, whereby these screws may be adjusted to position the wheel in its cylinder and to take up wear on the bearing of the wheel shaft 19.

In order that the rotations of this wheel shaft may be counted, I have mounted an indicator or counter 24 on a bracket 25 on the outside wall of the tank 11 and this indicator or counter is operated through a pinion 26 on the shaft 19, idler gear 27 and small gear 28, whereby the rotations of the shaft 19 are indicated on the dials 29, as shown in Figure 4.

This wheel cylinder 20, as shown, is a unitary structure and the parts carried by it may all be assembled before the cylinder is positioned in its casing and may be removed bodily therefrom for inspection and repairs.

In order to control the rotations of this measuring wheel, I have mounted a float 30 in the cylinder 31. This float is connected to a detent pin 32, the end 33 of which normally extends into position to engage one of the blades 18 of the measuring wheel and when a small portion of liquid is poured into the tank sufficient to raise the level sufficiently to raise the float 30, this float will then lift the detent and permit the free rotation of the wheel as the gasoline flows through the tank into the storage receptacle. To relieve air pressure within the tank and prevent the operation of the measuring device thereby, I provide the large opening 34 in the side of cylinder 31, the vent holes 35 in the top of the cylinder and hole 36 in the end of the upwardly-projecting neck and also the holes 37 in the protecting casing 38, which casing is riveted or locked so as to prevent tampering with the float.

It will also be noted that the cylinder 31, overhangs the outlet passageway 17 so as to prevent any instrument from being inserted into the inlet neck to tamper with the wheel.

It is found of importance in my improved device to provide a cover 39 for the counter or indicator 24, which is hinged at 40 at its upper end and the hinged portion being on the top of the casing, while at the lower end it has an opening which passes over the riveted staple 41 through which is a lock 42 adapted to be sealed against being unlocked by unauthorized persons.

By my improved construction of liquid measuring device, I can prevent fraud by being able to readily detect padded accounts for gasoline trying to show amounts not actually used.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A liquid measuring device for a storage receptacle, comprising a receiving tank having an inlet and a passageway therein placed above and communicating with the receptacle, a bucket wheel beneath said passageway, an indicator operatively related to the wheel, a float in said tank and means actuated by said float for automatically locking the wheel against rotation when there is no liquid flowing through the passageway.

2. A liquid measuring device for a storage receptacle, comprising a receiving tank having an inlet and a passageway therein and placed above and communicating with the receptacle, a bucket wheel rotatively mounted in the passageway, a cylinder communicating with the tank, a float within the cylinder, and a detent carried by the float and adapted to contact with the wheel when in its lowered position.

3. A liquid measuring device for a storage receptacle, comprising a receiving tank having an inlet and a passageway therein and placed above and in communication with the receptacle, a bucket wheel rotatively mounted in the passageway, a cylinder communicating with the tank, a float within the cylinder, and a detent carried by the float and adapted to contact with the wheel when in its lowered position, the cylinder being provided with air outlets.

4. A liquid measuring device for a storage receptacle, comprising a receiving tank having an inlet and a passageway therein and placed above and in communication with the receptacle, a bucket wheel rotatively mounted in the passageway, a cylinder communicating with the tank, a float within the cylinder, and a detent carried by the float and adapted to contact with the wheel when in its lowered position, the said cylinder overhanging the said passageway.

5. A liquid measuring device for a storage receptacle, comprising a receiving tank having an inlet and a passageway therein and placed above and in communication with the receptacle, a bucket wheel rotatively mounted in the passageway, a cylinder communicating with the tank, a float within the cylinder, a detent carried by the float and adapted to contact with the wheel when in its lowered position, the inlet being positioned to one side of the axial center of the tank, the cylinder being placed diametrically opposite the inlet and overhanging the axial center of the tank, and a deflecting plate extending transversely of the tank with its inner edge in vertical alignment with the inner wall of the cylinder.

In testimony whereof I affix my signature.

WILLIAM F. MOWRY.